Aug. 25, 1970  D. A. LOMBARDO  3,525,186
MULTI-STORY TRAILER BUILDING WITH LIFTING MEANS
Filed Aug. 2, 1968  5 Sheets-Sheet 1
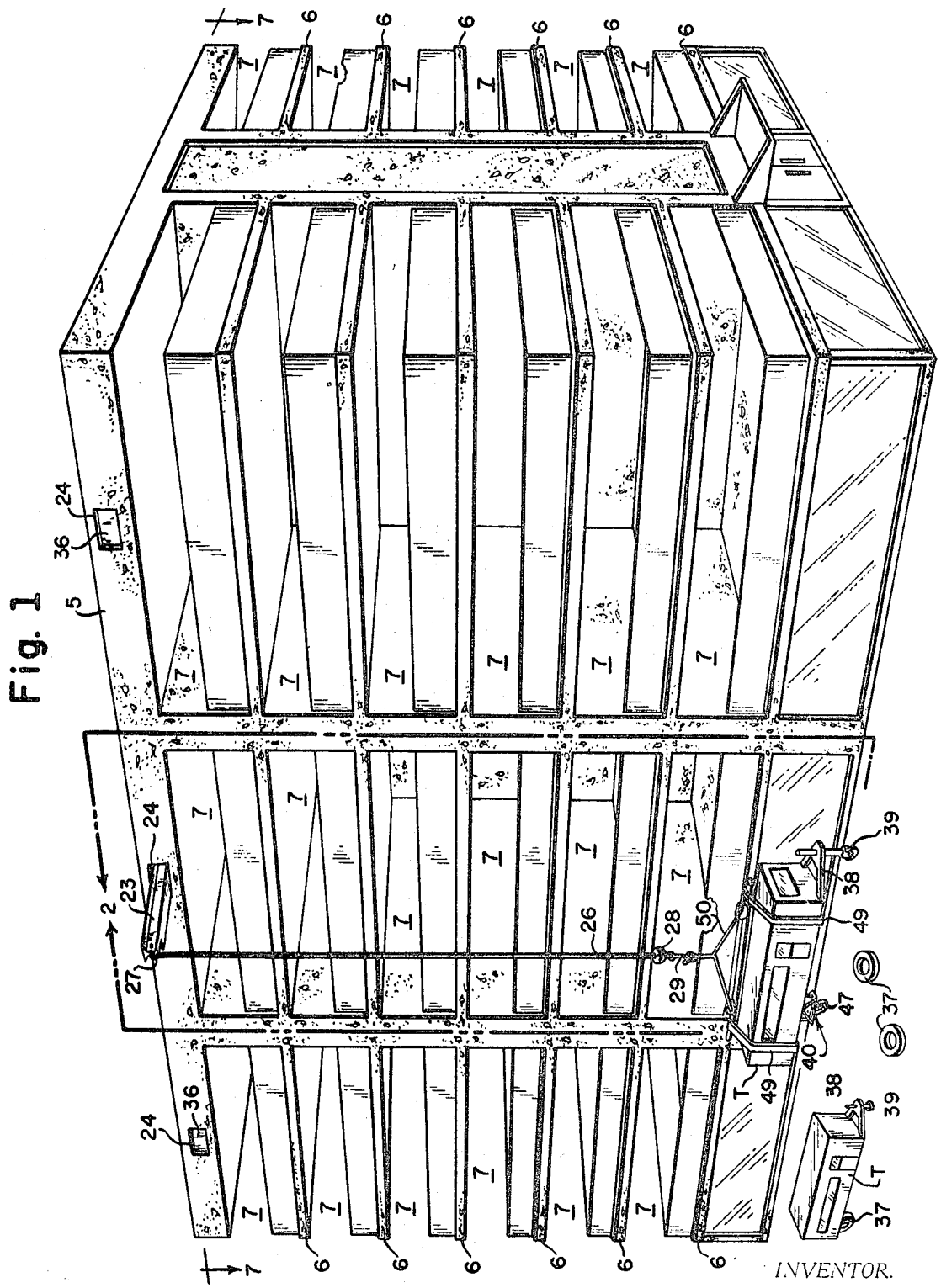
INVENTOR.
DOMINICK A. LOMBARDO
BY
ATTORNEY

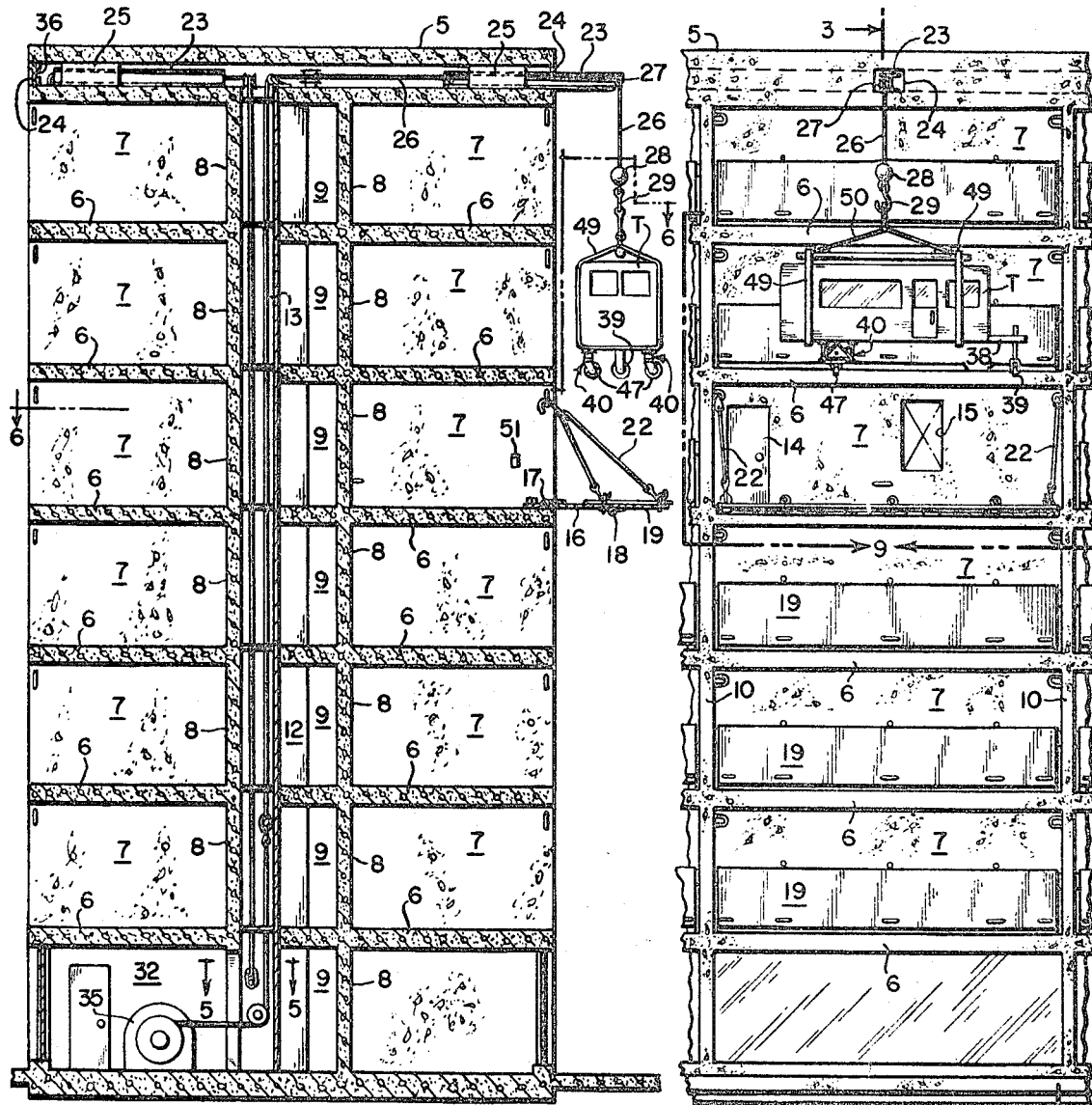
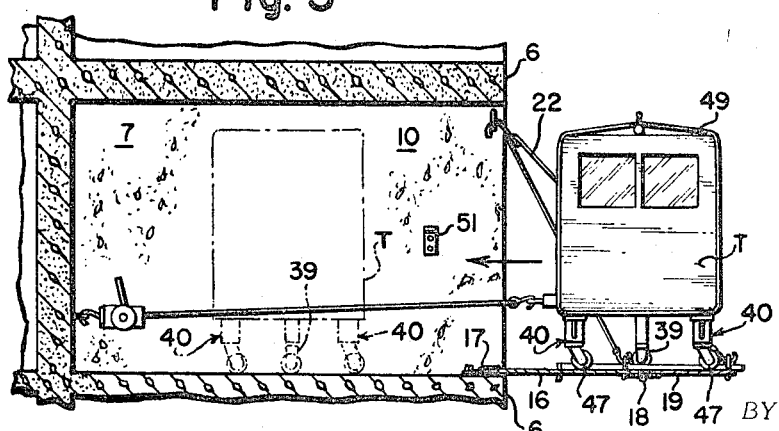
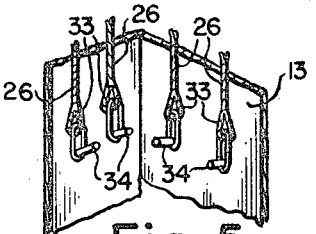

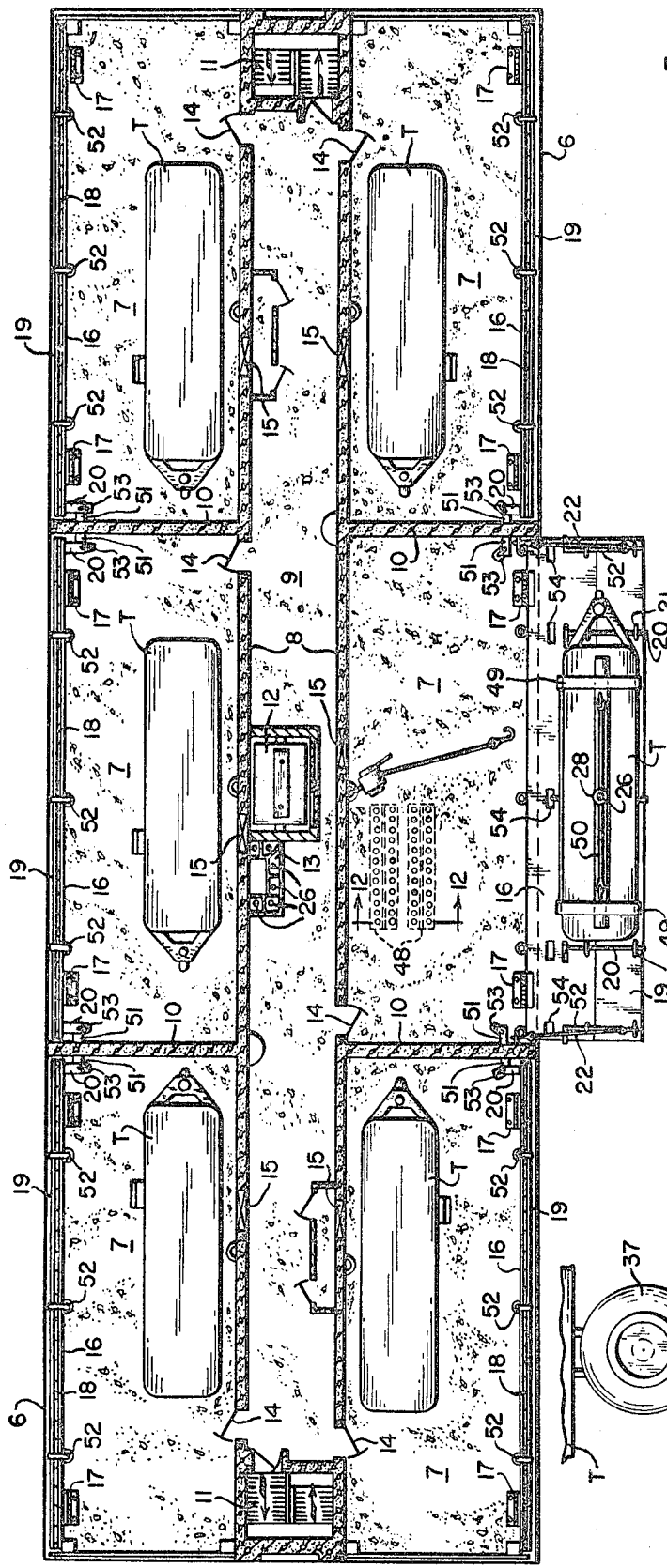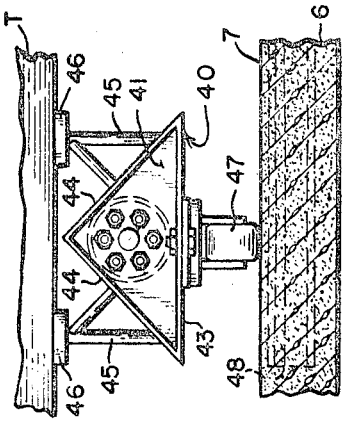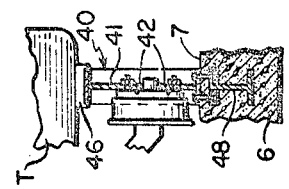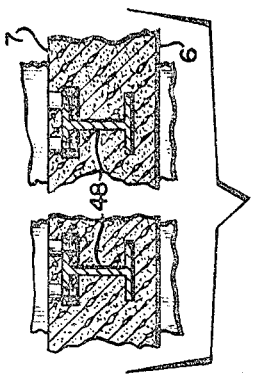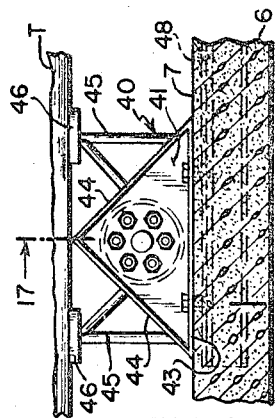

Aug. 25, 1970   D. A. LOMBARDO   3,525,186
MULTI-STORY TRAILER BUILDING WITH LIFTING MEANS
Filed Aug. 2, 1968   5 Sheets-Sheet 4
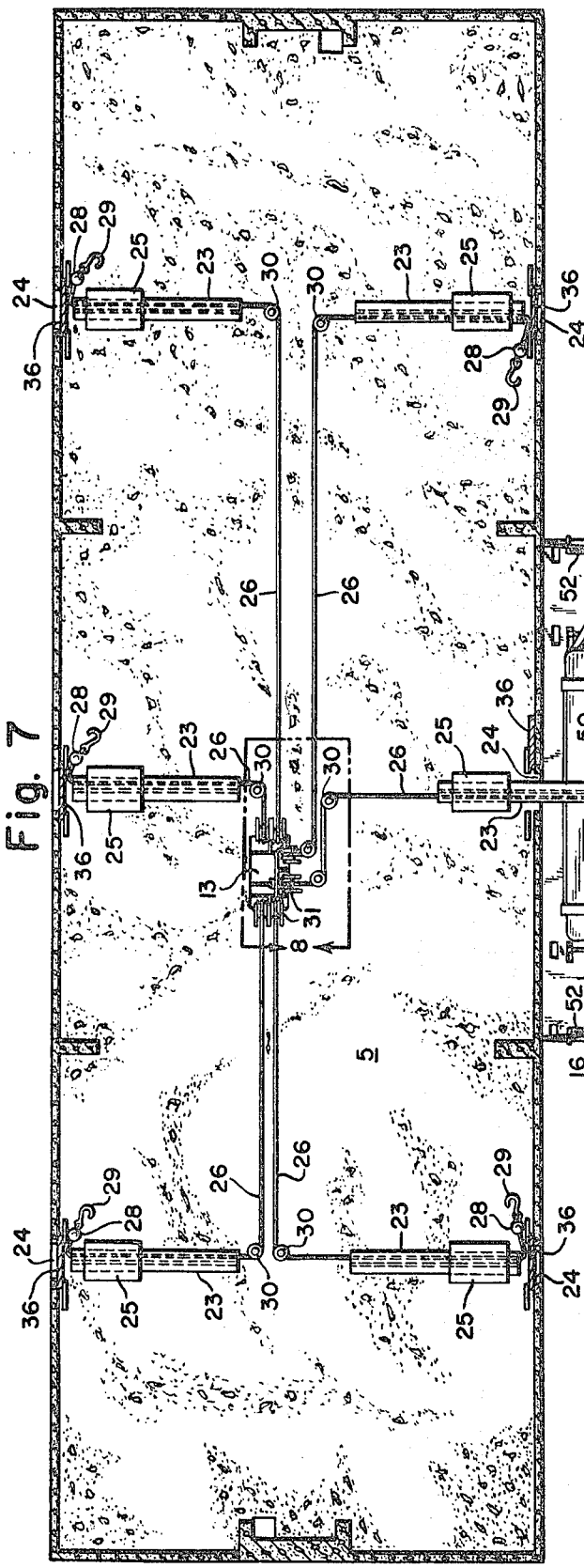
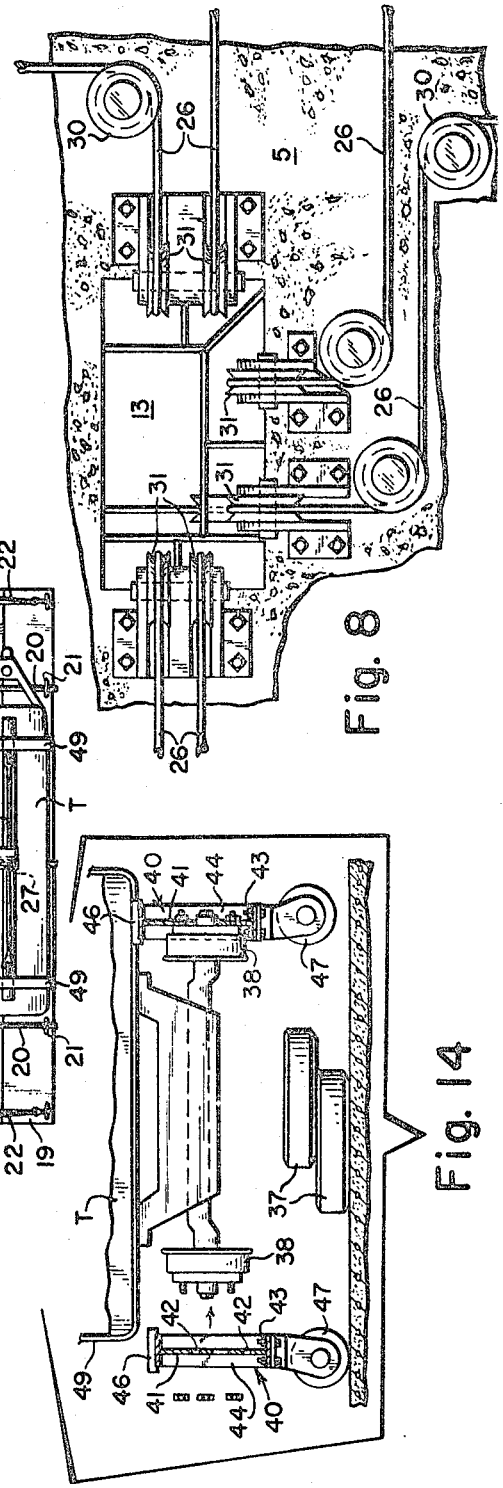
INVENTOR.
DOMINICK A. LOMBARDO
BY
ATTORNEY

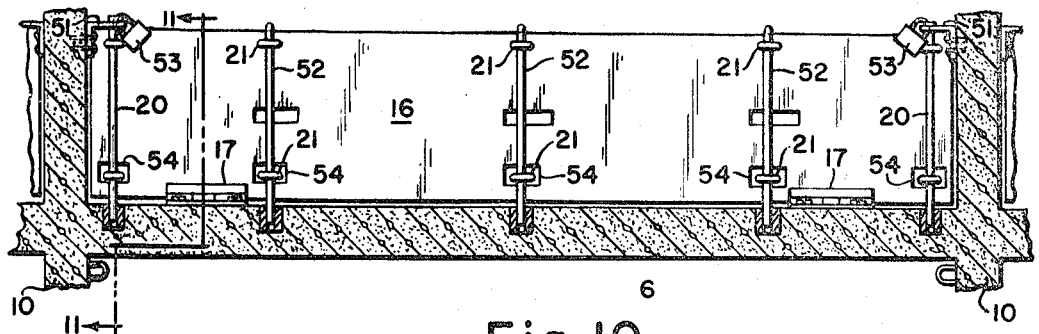
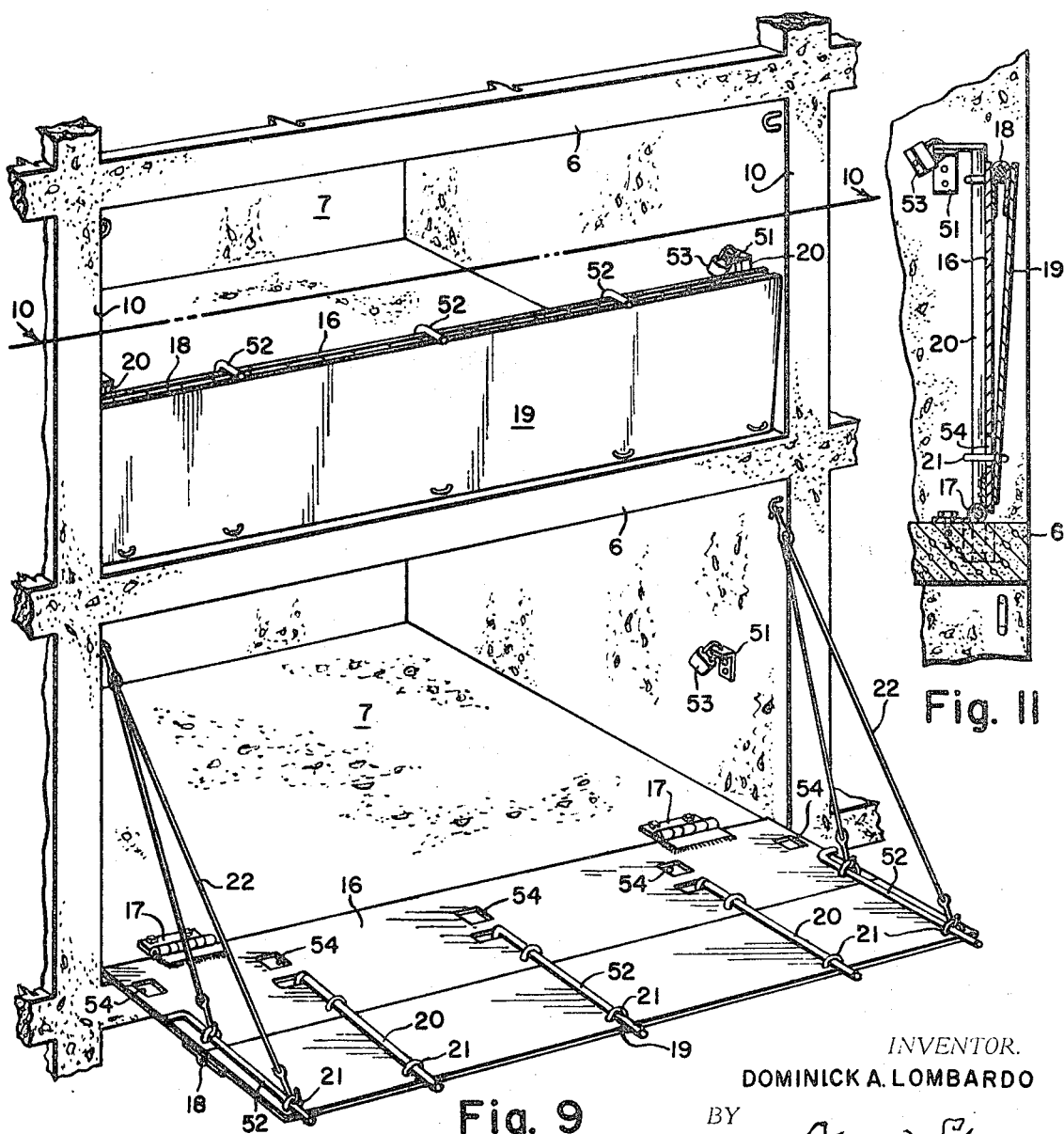

United States Patent Office 3,525,186
Patented Aug. 25, 1970

3,525,186
MULTI-STORY TRAILER BUILDING WITH
LIFTING MEANS
Dominick A. Lombardo, Box 14432,
North Palm Beach, Fla. 33403
Substituted for abandoned application Ser. No. 436,792,
Mar. 3, 1965. This application Aug. 2, 1968, Ser. No.
768,570
Int. Cl. E04h 6/18
U.S. Cl. 52—122                                    4 Claims

ABSTRACT OF THE DISCLOSURE

This invention relates to a multi-story building for housing house trailers. The building embodies a multiplicity of outwardly opening cubicles that are open upon all sides of the building. Each cubicle is provided with gates that extend outwardly from the cubicle to form platforms upon which the house trailer is rested prior to movement of the trailer inwardly to the cubicle and elevating means that project from a roof of the building and that carry hoisting cables that are connected to the trailer on the ground for elevating the trailer bodily to the particular platform of the cubicle selected.

---

This application is a substitute for application Ser. No. 436,792 filed Mar. 3, 1965, and now abandoned.

This invention relates to a multi-storied building primarily for the storage of conventional house trailers.

The building can and will assume any desirable shape or style necessary to blend in with the particular environment that is selected for the building site and the object of the building is to enable people heretofore restricted by finances, age and timidness to be in a position to travel without the encumberances and the insecurity that originally was placed on such a number also the building is adapted to house a modern trailer and with all of the conveniences incident to an apartment house of similar dimensions and wherein each house trailer is disposed in an individual recess and will offer to the house trailer owner an opportunity for an unobstructed view plus the privacy of his own trailer pad. He will no longer be at ground level with other trailers and he will not contend with the disadvantages that some trailer parks have with respect to a specified space lease.

With the unique idea of the multi-storied building, hereinafter described, trailer living will become more inviting to people previously against such a way of life. Cities and towns and zoning boards will take a more appreciative and approval look at this way of life and living and in the past, trailer parks were nearly always objectionable and their location and setting was not always to the best interest and comfort of the trailer owner. This has led to a somewhat lack of cooperation of appreciation of the trailer owner to attempt to beautify their immediate surroundings and naturally the area of a trailer park would have a somewhat bedraggled appearance and this appearance and attitude has contributed greatly to the lack of appreciation and cooperation by towns and zoning boards to encourage new trailer parks and if they were obliged to do so, the location was always the least desirable in many cases.

The building embodied in this application will be formed of modern steel and concrete and of attractive design. It will have multi-stories and these stories will be called "trailer pads." Each pad will be approximately 30 x 80 feet and each pad will have an outside view and the various floors of the building would have elevator service, garbage chutes and each pad would have its own utilities for quick connection and disconnection.

Novel features of construction and operation of the several component parks of this invention will be more clearly apparent during the course of the following description, wherein like characters of reference refer to like parts throughout the several figures.

In the drawings:

FIG. 1 is a perspective view of a building constructed in accordance with the invention and illustrating a method of elevating a house trailer to a particular cell or pad, FIG. 2 is a fragmentary vertical elevation of the building also illustrating the manner of placing the house trailers within a particular pad, FIG. 3 is a vertical sectional view taken substantially on line 3—3 of FIG. 2, FIG. 4 is a transverse section illustrating the means for shifting a trailer into a respective pad, FIG. 5 is a fragmentary perspective view taken substantially on line 5—5 of FIG. 3, FIG. 6 is a horizontal section taken on line 7—7 of FIG. 1 and illustrating certain components for the elevation of the house trailers, FIG. 7 is a horizontal section illustrating cable means for hoisting the house trailers to the respective pads, FIG. 8 is a fragmentary horizontal section on an enlarged scale illustrating cable means for hoisting the house trailers to the respective pads, FIG. 9 is a fragmentary perspective view of a pair of pads, a closure gate and a resting gate for the trailer, FIG. 10 is a section taken on line 10—10 of FIG. 9, looking in the direction of the arrows, FIG. 11 is a vertical section taken on line 11—11 of FIG. 10 and illustrating a closure gate in the closed position, FIG. 12 is a fragmentary section taken on line 12—12 of FIG. 6 and illustrating a securing means for the house trailer after placement onto the pad, FIG. 13 is a fragmentary side elevation of a trailer body and its ground wheel, FIG. 14 is a transverse section through the trailer illustrating the manner of substituting a trailer rest for the trailer wheels, FIG. 15 is a side elvation of a fragmentary portion of the trailer having the wheel removed and a trailer rest substituted therefor and in a position to be shifted to overlying relation to a trailer pad, FIG. 16 is a similar view, but with a caster of the rest being removed and the rest being bolted to the trailer pad, and FIG. 17 is a fragmentary section taken substantially on line 17—17 of FIG. 16.

Referring specifically to the drawings, in FIG. 1 there has been illustrated a typical multi-storied building of preferably reinforced concrete construction. The building is provided with a roof section 5 and multiple floor sections 6. The floor sections 6 are divided into a plurality of cubicles or pads indicated generally at 7 and the cubicles are defined by longitudinal partions 8 that extend for the full length of the building for creating a hallway 9. From the partitions 8, the cubicles are formed by transversely extending partitions 10. At each end of the hallway 9, there are provided stairwells 11 and intermediate the length of the hallway 9 is an elevator 12 that extends for the full height of the building. Also extending for the full height of the building, adjacent to the elevator 12 is a cable shaft 13, to be more clearly described. Each cubicle 7 has communication with the hallway 9 by doors 14 and various utilities, such as electricity and water is arranged in shafts 15 formed in the partitions 8 and communicating with each of the cubicles 7 for direction utilities to the several house trailers that may be disposed within the cubicles 7 and in a manner to be presently described.

Each of the cubicles 7 are provided across their openings with a combined gate and a rest employed in the hoisting of the trailers from the ground upward. The gate indicated generally in FIGS. 9, 10 and 11 comprises a flat hinge section 16 that is hinged at 17 to the marginal edge of the floor of each cubicle. The hinge section 16 has hinged connection at 18 with a second flat section 19 and whereby the gate, comprising the sections 16 and 19 are foldable upwardly to span the opening of the cubicle as a barrier to protect individuals from falling from the cubicle. The sections 16 and 19 are held against flexing by brace rods 20, slidable in eyes 21 and the gate is shifted upwardly by cables 22 from a horizontally extended position to a gate forming position, as illustrated in both FIGS. 9 and 11. When the gate is adapted to be swung outwardly for the resting support of a house trailer, as shown in FIGS. 2 and 3, the cables 22 are released and the sections 16 and 19 unfolded and swung downwardly to provide a horizontal rest for the trailer when the trailer is being hoisted upwardly and the brace rods 20 moved into bracing position to distribute the load upon the hinge 18 and the cables 22 also support the gate in its unfolded position at the opposite ends. As will be presently described, the trailer is hoisted upwardly from the ground to a point above the particular cubicle in which it is to be disposed and the gate is then swung downwardly to the supporting position shown in FIG. 9. The trailer is then lowered to be disposed upon the extended gate prior to being shifted into the cubicle.

The roof of the building is of double thickness, as shown in FIG. 3 and disposed within the opening between the roof and the next adjacent ceiling, are a plurality of preferably I-beams 23 that are slidable outwardly from the opening of the roof through openings 24 and as will be observed, the several beams 23 project outwardly substantially centrally of each cubicle. The beams 23 are disposed in guides 25, fixed to the bottom of the roof opening and whereby to guide the beams 23 inwardly and outwardly. Carried by each of the beams 23, is a cable 26, engaging a grooved pulley 27 at the outer ends of the beams and with the cables 26 extending from the outer ends of the beams and provided with a weighted ball 28 and a hook 29. The cables also traverse grooved pulleys 30 disposed at adjacent the inner ends of the beams 23 and the several cables 26 are guided by pulleys 31 whereby the cables extend downwardly through the cable shaft 13 to terminate within an enclosure 32 and normally held against movement by cable eyes 33 that are engaged over fixed pins 34. Also disposed within an area 32 which is normally a control room, is an electric winch 35 that may be connected to any selected cable 26 for elevating a house trailer to a respective cubicle. Each cable 26 controls the hoisting movement of a house trailer from the ground level, to either of the cubicles 7 in a vertical tier. Each of the openings 24 for the beams 23 may be covered and uncovered by a sliding plate 36.

A trailer of conventional construction is illustrated at T in FIG. 1 and normally carries ground wheels 37 and a frame extension 38, carrying a dolly 39. Since it is necessary to elevate the trailer to a particular cubicle 7, it first becomes necessary to remove the wheels 37 from the hubs 38 and this is accomplished by jacking the trailer up and removing the wheels and then a triangular rest 40, having a web portion 41 that is apertured at spaced apart points at 42, to correspond with the wheel mounting bolts and the web 42 is shifted over the bolts and securely bolted in position. Each of the rests carry a relatively wide bottom flange 43 and diagonal flanges 44 and the flanges 44 carry adjustable rods 45, provided at the tops with pads 46. The pads 46 are adapted to engage against the bottom of the trailer to constitute a support. Bolted to the bottom flange 43 is a caster 47 whereby the trailer may be rolled into position into either of the cubicles 7. Molded into the floor area of each cubicle 7 are I-beams 48 that are provided with threaded openings to which the rest 40 may be bolted after the trailer has been positioned in the cubicle and to thereby anchor the trailer against shifting under wind pressures. The bottom flange 43 of the support 40 is also provided with spaced apart bolts whereby the support may be securely bolted to the floor of the cubicle through the threaded openings of the I-beams 48.

In order to elevate the trailer, a suitable harness indicated at 49 in FIG. 1 is fixed to the body of the trailer adjacent each end and a connecting cable 50 is adapted to receive the hook 29 of the cable.

In the use of the device, a trailer is shifted to the position illustrated in FIG. 1 and the beam for that particular tier of cubicles is extended outwardly from the opening 24 and the cable 26 is lowered, due to the weighted ball 28 and then the lower end of the particular cable is connected to the winch 35. Either the winch 35 is actuated to lift the trailer a slight distance to permit the wheels to be removed and the rest 40 connected thereto. The operation of the winch is then continued until the trailer is elevated to a position above the particular cubicle in which it is to be placed and shown in FIG. 3. The gate is then unfolded and lowered by the cables 22, forming a shelf-like support that extends outwardly from the selected cubicle. The brace rods 20 may be engaged through the eyes 21 and the winch is then reversed, lowering the trailer downwardly to rest upon the extended gate. The trailer is then rolled into the cubicle 7 upon the casters 47 and the dolly to a predetermined position whereby the inner support 40 is in alignment with the I-beams 48 and then the trailer is jacked by towing suitable jacks so that the casters 47 may be removed and the trailer then rolled to rest upon the supports 40 and bolted to the I-beams 48. Any suitable means may be employed to pull the trailer inwardly from the gate, such as a hand winch having cables extending therefrom and provided with a hook that may be connected into any structural part of the trailer or that may be connected to the outer support 40. After the trailer has been lowered and extended upon the extended gate, the cable 26 and the harness is removed and the cable 26 then shifted to its initial position in the opening of the rod and the beams 23 also shiftable backwardly into the roof opening. After the trailer has been positioned within the cubicle, the gate sections 16 and 19 are folded upwardly to extend across the cubicle opening, the pins 52 are shifted upwardly to enter an opening of the bracket 51 where it may be locked in position by a suitable lock 53. When shifting the gate upwardly, the rods 20 are rotated and shifted downwardly to enter openings 54 of the gate section 16. The gate is obviously movable in its swinging action by the cables 22 and after the gate has been folded and moved to position in the opening, the cables 22 may be stored in any desirable manner. With the trailer fully disposed within the cubicle 7 and bolted securely to the I-beams 48, the several service connections may be completed to the connections of the trailer, all of which is well known in the art.

An example of the use of such a building for the storage of house trailers, the procedure is as follows:

A trailer owner will contact the organization owning the building and will enter into a lease for a particular pad or cubicle. He either delivers the trailer to the building or of course may have the trailer conveyed by a towing vehicle and the trailer is stationed at a point upon the ground below a tier of cubicles in which the particular cubicle is disposed. The trailer is now ready to receive the hoisting cable 26 after which the wheels are removed and the support device 40 engages with the axle of the trailer and through the medium of the harness and the hoisting cable, the trailer is elevated and the gate swung outwardly to constitute a rest for the trailer when it is shifted downwardly. Many novel ideas may be incorporated into the floor of the cubicle, such as artificial grass, chairs or the like and it is the intention of the patentee to build a series of modern structures throughout the country, all enjoying the same luxury and comfortable way of living, much in the nature of an apartment house and provides a very distinct type of trailer assembly and is a distinct advantage over the conventional trailer parks and due to its novelty creates a very desirable ornamental structure having none of the disagreeable appearances common to trailer parks.

It is to be understood that the invention is not limited to the precise construction shown, but that changes are contemplated as readily fall within the spirit of the invention as shall be determined by the scope of the subjoined claims.

I claim:

1. A building for supporting a plurality of house trailers, the building having a plurality of spaced apart floors and with each floor being divided by partitions to form a multiplicity of similar cubicles that open outwardly from the face of the building, the building upon each floor being divided longitudinally by partitions forming a hallway, each of the cubicles upon their front opening being provided with a hinged gate that extends entirely across the opening, the gate being extendable outwardly to form a platform, a roof of the building being provided with a plurality of shiftable beams that extend outwardly from the roof for the support of a hoisting cable and with each of the cables extending downwardly across the cubicles, the cables being extendable downwardly for connection with a house trailer that is disposed upon the ground level, power means for controlling the cable and to elevate a house trailer from the ground level to a particular cubicle and with the house trailer after being shifted upwardly, adapted to rest upon the platform for subsequent shifting into the cubicle, the gate being subsequently swung inwardly to close the opening of the cubicle, means connected to the bottom of the trailer for resting engagement upon the floor of the cubicle after the trailer has been shifted therein, means for anchoring the trailer to the cubicle to prevent accidental movement thereof, and means extending for the full height of the building for connecting various utilities to the individual trailers, each of the cubicles having a door opening that communicates with the hallway.

2. A multi-storied building having a plurality of parallel floors that extend from end to end of the building and a roof device that overlies the uppermost floor and with the roof being formed hollow, the several floors being partitioned to form a multiplicity of cubicles that open outwardly from the sides and ends of the building, the open sides of the cubicles being provided with a hinged closure gate that spans the entire opening of the cubicle, the closure gate being formed in a pair of hinged together sections and with one section being connected to the floor of the cubicle, the gate being swingable outwardly to form a relatively wide platform, means carried by the platform and a wall of the cubicle to support the sections when the gate is swung to a platform forming position, and brace rods spanning the gate when the gate has been extended to a platform forming position outwardly from the side of the building and whereby to form a rest for a house trailer that is elevated upwardly from a ground level to a particular cubicle, the trailer being shifted inwardly from the platform for placement into the cubicle.

3. The structure according to claim 2 including cable means for controlling the movement of the gate sections to and from a hinged relation with respect to each other, the brace rods being slidable through eyes carried by the gate sections and to additionally brace the platform against sagging when a trailer is supported thereon, the said cables adapted to elevate and lower the gate to and from the platform forming position and means to lock the gate in the folded position to constitute a fence across the opening of the cubicle.

4. The structure according to claim 1 wherein the roof is formed of upper and lower panels, creating a cavity within the roof, said shiftable beams disposed in the cavity of the roof and comprising a plurality of I-beams, that slide outwardly from an opening in the marginal edges of the roof, guides for the I-beams and said cables trained along each I-beam toward their outer ends and provided with a hook and a weighted ball, a plurality of guide pulleys receiving the cables from each of the I-beams and with the cables extending downwardly from the roof to the bottom of the building and extending through a vertically disposed cable shaft that extends for the full height of the building and with each individual cable being secured against movement in the bottom of the building for subsequent connection to a power hoisting device that is arranged within the lower part of the building when a trailer is to be elevated and when a particular I-beam is shifted outwardly and its cable lowered, after connection to the power unit to a point where the cable is engaged with the body of the trailer and then elevated to a point slightly above a particular cubicle and subsequently lowered to rest upon the platform, the trailer then being rolled inwardly to be disposed within the cubicle for anchoring engagement to the floor of the cubicle at a predetermined point of rest and cable means carried upon a rear wall of the cubicle and connected to the body of the trailer for moving the cable from the platform to the point of rest within the cubicles.

References Cited

UNITED STATES PATENTS

| | | |
|---|---|---|
| 1,554,584 | 9/1925 | Lake. |
| 2,499,498 | 3/1950 | Hammond _____ 52—236 X |
| 3,061,120 | 10/1962 | Barnett. |

JOHN E. MURTAGH, Primary Examiner

U.S. Cl. X.R.

52—79, 236; 214—16.1